(12) United States Patent
Huai et al.

(10) Patent No.: US 12,190,202 B2
(45) Date of Patent: Jan. 7, 2025

(54) QUANTUM CHIP, QUANTUM PROCESSOR AND QUANTUM COMPUTER

(71) Applicant: TENCENT TECHNOLOGY (SHENZHEN) COMPANY LIMITED, Shenzhen (CN)

(72) Inventors: Sainan Huai, Shenzhen (CN); Yu Zhou, Shenzhen (CN); Zhenxing Zhang, Shenzhen (CN); Yarui Zheng, Shenzhen (CN); Wenlong Zhang, Shenzhen (CN); Chuhong Yang, Shenzhen (CN); Maochun Dai, Shenzhen (CN); Yicong Zheng, Shenzhen (CN); Shengyu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 530 days.

(21) Appl. No.: 17/540,474

(22) Filed: Dec. 2, 2021

(65) Prior Publication Data
US 2022/0092462 A1    Mar. 24, 2022

Related U.S. Application Data

(63) Continuation of application No. PCT/CN2021/111184, filed on Aug. 6, 2021.

(30) Foreign Application Priority Data

Sep. 1, 2020    (CN) .......................... 202010906492.6

(51) Int. Cl.
    *G06N 10/00*    (2022.01)
(52) U.S. Cl.
    CPC .................................. *G06N 10/00* (2019.01)

(58) Field of Classification Search
    CPC ........ G06N 10/00; G06N 10/20; G06N 10/40; G06N 10/60; G06N 10/70; G06N 10/80; B82Y 10/00; G06F 30/392
    (Continued)

(56) References Cited

U.S. PATENT DOCUMENTS

| 2019/0044047 A1 | 2/2019 | Elsherbini et al. |
| 2019/0149246 A1 | 5/2019 | Bishop et al. |

(Continued)

FOREIGN PATENT DOCUMENTS

| CN | 107994307 A | 5/2018 |
| CN | 109376870 A | 2/2019 |

(Continued)

OTHER PUBLICATIONS

Extended European Search Report regarding EP 21 79 1235 dated May 27, 2022, 8 pages.

(Continued)

*Primary Examiner* — Paul Dinh
(74) *Attorney, Agent, or Firm* — Crowell & Moring LLP

(57) ABSTRACT

This application discloses methods and devices for a quantum chip, a quantum processor and a quantum computer, and relates to the field of quantum technology. The quantum chip includes a bottom sheet and a top sheet; a qubit array disposed on the top sheet, the qubit array comprising a plurality of qubits distributed in an array structure of M rows by N columns, and M and N being both integers greater than 1; a reading cavity disposed on the bottom sheet, and the reading cavity being configured to acquire status information of a qubit in the qubit array; and the bottom sheet and the top sheet being electrically connected.

19 Claims, 5 Drawing Sheets

(58) Field of Classification Search
USPC .......................................................... 716/138
See application file for complete search history.

(56) References Cited

U.S. PATENT DOCUMENTS

| | | | |
|---|---|---|---|
| 2020/0012961 A1* | 1/2020 | Kelly | G06N 10/00 |
| 2023/0229952 A1* | 7/2023 | Pakkiam | G06N 10/70 |
| | | | 716/100 |
| 2024/0037438 A1* | 2/2024 | Zhao | G06N 10/40 |
| 2024/0061986 A1* | 2/2024 | Wang | G06F 30/392 |

FOREIGN PATENT DOCUMENTS

| | | |
|---|---|---|
| CN | 109874327 A | 6/2019 |
| CN | 110210067 A | 9/2019 |
| CN | 110431568 A | 11/2019 |
| CN | 111510157 A | 8/2020 |
| CN | 111967603 A | 11/2020 |
| JP | 2008-294167 A | 12/2008 |
| JP | 2016-51351 A | 4/2016 |
| JP | 2019-530336 | 10/2019 |
| WO | WO2020/037373 | 2/2020 |

OTHER PUBLICATIONS

Rosenberg et al., "3D integrated superconducting qubits", MIP Lincoln Laboratory, Cambridge, MA, Jun. 20, 2017, 6 pages.

Das et al., "Cryogenic Qubit Integration for Quantum Computing", 2018 IEEE 68th Electronic Components and Technology Conference (ECTC), IEEE, May 29, 2018, pp. 504-514.

Mukai et al., "Pseudo-2D superconducting quantum computing circuit for the surface code", Cornell University Library, 201 Olin Library Cornell University, Ithaca, NY, Feb. 21, 2019, 6 pages.

International Search Report with English Concise Explanation of References and Written Opinion regarding PCT/CN2021/111184 dated Nov. 2, 2021.

Japanese Office Action with translation regarding 2021-562094 dated Jun. 26, 2023.

Japanese Office Action with translation regarding JP2021-562094 dated Dec. 6, 2022.

Chinese Office Action with English Concise Explanation regarding CN2020010906492.6 dated Dec. 17, 2021.

Extended European Search Report regarding 21 791 235.1 dated Jun. 25, 2024, 5 pages.

* cited by examiner

QUANTUM CHIP, QUANTUM PROCESSOR AND QUANTUM COMPUTER

RELATED APPLICATION

This application is a continuation application of PCT Patent Application No. PCT/CN2021/111184, filed on Aug. 6, 2021, which claims priority to Chinese Patent Application No. 202010906492.6, filed with the National Intellectual Property Administration, PRC on Sep. 1, 2020, both of which are incorporated herein by reference in their entireties.

FIELD OF THE TECHNOLOGY

Embodiments of this application relate to the field of quantum technology, and in particular, to a quantum chip, a quantum processor, and a quantum computer.

BACKGROUND OF THE DISCLOSURE

Quantum chips are the core processing components of quantum computers.

At present, the structural design of quantum chips is still in the exploratory stage. In the structural design of quantum chips provided by a small number of related technologies, the arrangement of qubits is not proper enough, which affects the number of bits that the quantum chip can hold and the accuracy of chip processing.

The present disclosure describes embodiments for quantum chip, quantum processor, and/or quantum computer, addressing at least one of the problems/issues discussed above, optimizing arrangement of qubits and related devices, achieving a larger number of bits, improving accuracy, thereby increasing the computing power of the quantum chip, quantum processor, and/or quantum computer. Some embodiments in the present disclosure provides better connectivity between qubits, which is beneficial to increasing the quantum volume and reducing the difficulty of algorithm execution; and realizes the separate layout of qubits and other components to move some destructive devices or processing techniques out of the bit sample layer, thereby increasing the chip wiring space and the coherence of the qubits under complex processes, thus achieving a larger number of bits and high accuracy and increasing the computing power of the quantum chip.

SUMMARY

Embodiments of this application provide a quantum chip, a quantum processor, and a quantum computer, which can optimize the arrangement of qubits and related devices to achieve a larger number of bits and high accuracy at the same time, thereby increasing the computing power of the quantum chip.

The present disclosure describes a quantum chip. The quantum chip includes a bottom sheet and a top sheet; a qubit array disposed on the top sheet, the qubit array comprising a plurality of qubits distributed in an array structure of M rows by N columns, and M and N being both integers greater than 1; a reading cavity disposed on the bottom sheet, and the reading cavity being configured to acquire status information of a qubit in the qubit array; and the bottom sheet and the top sheet being electrically connected.

The present disclosure describes a quantum computer. The quantum computer includes a quantum chip, wherein the quantum chip includes: a bottom sheet and a top sheet; a qubit array disposed on the top sheet, the qubit array comprising a plurality of qubits distributed in an array structure of M rows by N columns, and M and N being both integers greater than 1; a reading cavity disposed on the bottom sheet, and the reading cavity being configured to acquire status information of a qubit in the qubit array; and the bottom sheet and the top sheet being electrically connected.

The present disclosure describes a method for manufacturing a quantum chip. The method includes: constructing a bottom sheet and a top sheet; disposing a qubit array on the top sheet, the qubit array comprising a plurality of qubits distributed in an array structure of M rows by N columns, and M and N being both integers greater than 1; disposing a reading cavity on the bottom sheet, and the reading cavity being configured to acquire status information of a qubit in the qubit array; and electrically connecting the bottom sheet and the top sheet.

According to another aspect of the embodiments of this application, a quantum chip is provided. The quantum chip includes a bottom sheet and a top sheet.

A qubit array is arranged on the top sheet, the qubit array includes a plurality of qubits distributed in an array structure of M rows by N columns, and M and N are both integers greater than 1.

A reading cavity is provided on the bottom sheet, and the reading cavity is configured to acquire status information of the qubit.

The bottom sheet and the top sheet are electrically connected.

According to an aspect of the embodiments of this application, a quantum processor is provided. The quantum processor includes the quantum chip described above.

According to an aspect of the embodiments of this application, a quantum computer is provided. The quantum computer includes the quantum chip described above.

The technical solutions provided in the embodiments of this application may bring the following beneficial effects:

On the one hand, in terms of the arrangement of qubits, a surface code structure arranged in M rows by N columns is adopted to provide better connectivity between qubits, which is beneficial to increasing the quantum volume and reducing the difficulty of algorithm execution, and provides a stronger error correction capability and analysis capability for boundary error distribution during decoding, as well as more flexible scalability and adaptability to larger-scale quantum chips. On the other hand, in terms of chip architecture, qubits are laid out on the top sheet, and other devices such as the reading cavity, filters, bit control lines, reading lines, and air bridges are arranged on the bottom sheet, which realizes the separate layout of qubits and other devices to move some destructive devices or processing techniques out of the bit sample layer, thereby increasing the chip wiring space and the coherence of the qubits under complex processes. Based on the above two points, the arrangement of qubits and related devices is optimized to achieve a larger number of bits and high accuracy at the same time, thereby increasing the computing power of the quantum chip.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other accompanying drawings from these accompanying drawings without creative efforts.

DESCRIPTION OF EMBODIMENTS

Figure 1:
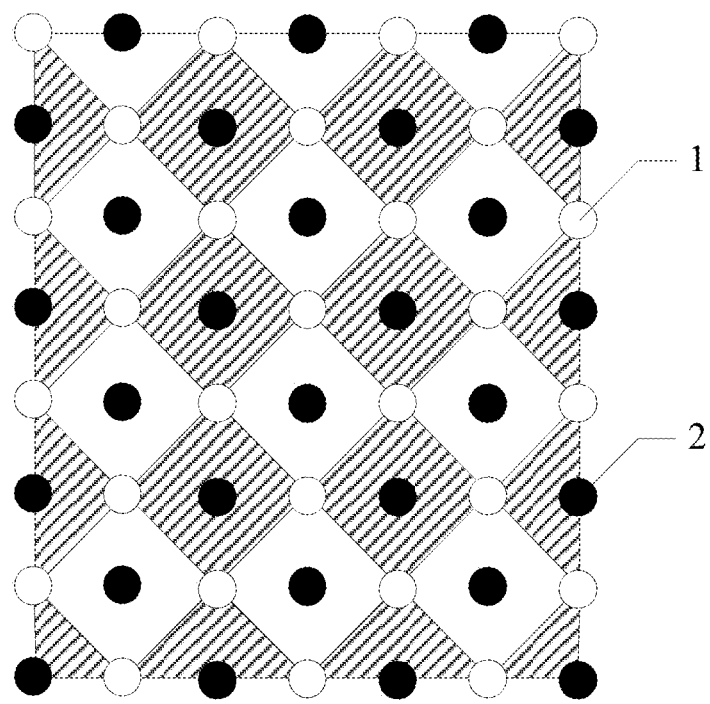
FIG. 1 is a schematic diagram of a two-dimensional structure of a surface code provided by an embodiment of this application.

To make objectives, technical solutions, and advantages of this application clearer, the following further describes implementations of this application in detail with reference to the accompanying drawings.

The cloud technology is a hosting technology that unifies a series of resources such as hardware, software, and networks in a wide area network or a local area network to implement computing, storage, processing, and sharing of data.

Cloud technology is a general term for network technology, information technology, integration technology, management platform technology, and application technology based on cloud computing business model applications. It can be used as a resource pool, which is used on demand and flexible. Cloud computing technology will become an important support. Back-end services of technical network systems require a large amount of computing and storage resources, such as video websites, image websites and more portal websites. With the rapid development and application of the Internet industry, in the future, each item may have its own identification mark, which needs to be transmitted to a back-end system for logical processing. Data of different levels will be processed separately, and data in various industries all need to be supported by a powerful system and implemented by cloud computing.

Cloud technology involves basic technologies such as cloud computing, cloud storage, database, and big data. Cloud applications provided based on cloud technology include medical cloud, cloud Internet of Things (IoT), cloud security, cloud calling, private cloud, public cloud, hybrid cloud, cloud gaming, cloud education, cloud conference, cloud social, artificial intelligence (AI) cloud services, etc. With the development of cloud technology and its application in different fields, more and more cloud applications will appear.

Generally, a system built based on cloud technology includes a server and a terminal. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected through wired or wireless communication, which is not limited in this application.

A quantum computer is a machine that uses the principles of quantum mechanics to perform calculations. Based on the superposition principle and quantum entanglement of quantum mechanics, quantum computers have strong parallel processing capabilities and can solve some problems that are difficult for classical computers to calculate. Because of the zero resistance characteristic of superconducting qubits and that the manufacturing process for superconducting qubits is similar to that for integrated circuits, quantum computing systems constructed using superconducting qubits are one of the most promising systems for realizing practical quantum computing.

A quantum processor refers to a quantum-level computer processor, or a computing processor on quantum level, that is, the processor of a quantum computer. The quantum processor may include one or more quantum chips.

The quantum chips, which may be referred to as superconducting quantum chips in some embodiments, are central processing units of quantum computers, and are the core components of quantum computers. The quantum chip integrates quantum circuits on the substrate, and carries the function of quantum information processing. As can be learned from the development history of traditional computers, quantum computers need to develop toward integration after overcoming the bottleneck technologies, in order to achieve commercialization and industrial upgrading. Superconducting systems, semiconductor quantum dot systems, micro-nano photonics systems, and even atomic and ion systems are all expected to develop through the advancement of chip technology. From the perspective of development, superconducting quantum chip systems are technologically ahead of other physical systems. Traditional semiconductor quantum dot systems are also a goal pursued by people. This is because the development of traditional semiconductor industry has been very mature. When semiconductor quantum chips, for example, break through the limitation/threshold of fault-tolerant quantum computing in terms of decoherence time and/or control precision, the existing achievements of the traditional semiconductor industry can be integrated, which saves the development costs.

In view of the advantages of quantum computers, systems to be built based on cloud technology in the future can use quantum computers to perform some processing and calculations to provide better services.

Before the technical solutions of this application are described, some terms involved in this application are explained first.

1. Medium-Scale Quantum Chip

The number of qubits contained in a medium-scale quantum chip is 50-100. One of the applications of quantum computing is to simulate quantum systems. A quantum system containing only a dozen qubits can consume a huge amount of supercomputer resources. Assuming that a system contains 50 qubits, $2^{50}$ being approximately $10^{15}$ complex amplitudes may be required to describe the state of the system. If a complex amplitude is stored with a precision at 128-bit level, 256 bits or 32 bytes are needed to store each amplitude (e.g., real part and imaginary part of a complex amplitude), and there is a total of $32 \times 10^{15}$ bytes, approximately 32,000 TB, of information, which is far beyond the capacity of existing computers. In the case of 90 qubits at the same precision level, $32 \times 10^{27}$ bytes are required.

2. Flip Chip Technology

Flip chip technology, or referred to as "flip-chip packaging method", is a type of chip packaging technology. Different from the past chip packaging technology where a chip is directly placed on a substrate and then the chip is connected to pads (referring to the input/output part of the chip) on the substrate by wire bonding, in the flip-chip packaging technology, bumps are grown at the connection points on the chip, and then the chip is turned upside down and directly connected to a package casing or wiring substrate. This technology has been widely used in the field of chip processing. A chip fabricated by the flip chip process is called a flip chip.

3. Surface Code

A surface code is a topological quantum correction code defined on a two-dimensional manifold. A stabilizer generator of the surface code is generally supported by four qubits (supported by two qubits at a boundary), and a logic operator of the surface code is a non-trivial chain of a strip-shaped spanning array. A specific two-dimensional structure of the surface code is shown in FIG. 1: white circles 1 represent data qubits used for quantum computing, and black circles 2 represent auxiliary qubits. Squares (or triangles) filled with white and diagonal lines represent two different types of stabilizer generators, which are configured to detect evolution errors of Pauli Z and X randomly generated on the quantum state of the physical qubit. In this application, a design architecture corresponding to the surface code topology shown in FIG. 1 will be adopted. In some implementations, a stabilizer generator may refer to a generator of a quantum stabilizer code.

As described by Moore's Law, computing performance can be continuously improved by continuously reducing the size of components and increasing the integration level of electronic chips (the number of transistors that can be accommodated). The introduction of more advanced chip processing technologies has gradually improved the production precision of traditional chips from tens of nanometers to 7 nanometers or even lower, approaching the atomic scale. At this scale, quantum effects have begun to manifest, including quantum tunneling and entanglement, and the behavior of devices cannot be predicted and designed using classical theories. On the other hand, the smaller the device size and the higher the degree of integration, the greater the need for heat dissipation. When the heat dissipation is insufficient, the stability and accuracy of operation of the devices will decrease. Therefore, in the post-Moore era, the improvement of the computing power of classical computers has also become difficult, and many scientists have placed their hopes of development on quantum computing.

As early as 1982, Richard Feynman pointed out when describing quantum simulations that when quantum simulations consider many-body problems, a very large number of degrees of freedom are required (where the number increases exponentially with the number of particles). At this level, classical computers can no longer provide effective simulations. The characteristics of the superposition principle and quantum entanglement of quantum mechanics enable quantum computers to have strong parallel processing capabilities. Medium-scale qubits can already provide a large enough Hilbert space, and is expected to break the computing power limit of traditional computers and solve large-scale computing problems that cannot be solved by classical computers, and therefore have high potential in fields such as quantum chemical simulation, quantum artificial intelligence and cryptanalysis, weather forecasting, drug design, financial analysis, and petroleum exploration. Because the manufacturing process for superconducting qubits is similar to that for traditional integrated circuits, superconducting qubits have a significant advantage in scalability. In addition, the zero-resistance characteristic allows superconducting qubits to have a longer coherence time. The superconducting quantum computing solution, which has been developing rapidly in recent years, has also attracted the attention of academia and industry and has become one of the most promising technical solutions to first realize practical quantum computing.

According to the criterion proposed by physicist DiVincenzo in 2000, the increase in the number of qubits is only part of the problem. The greater the number of qubits, the more complex the interaction between them. As the number of bits increases, it also needs to be ensured that the accuracy of the bits is sufficiently high. From the point of view of chip design, it is very important to minimize the crosstalk between bits and the coupling with the environment while ensuring the reading efficiency. Quantum chips can include elements such as qubits, reading cavities, filters, reading lines, bit control lines, and air bridges. In some implementations, small-scale superconducting quantum chips can adopt a single-layer planar structure. For example, qubits in the chip are arranged in two rows, and each qubit is directly in capacitive interaction with neighboring bits only. Such chips may have a higher scalability, and the algorithm is more difficult to execute. Alternatively in some other implementation, a wrap-around structure (or a surrounding structure) may be adopted, which uses a resonant cavity to achieve coupling between any two bits. However, such a scattered layout takes up a large chip area, and the bit control lines and the reading lines often need to cross each other, affecting stability and/or causing crosstalk. For medium-scale quantum chips, when either arrangement method is adopted, it is quite difficult to realize the layout of numerous components in the limited plane space and ensure a high quantum volume. "Quantum volume" is a more comprehensive performance measurement indicator introduced by International Business Machines Corporation (IBM), including elements such as the number of qubits, connection performance, compiler and software stack performance. The addressability and scalability of bits promoted the development of 3D packaging and the flip chip process.

Figure 2A:
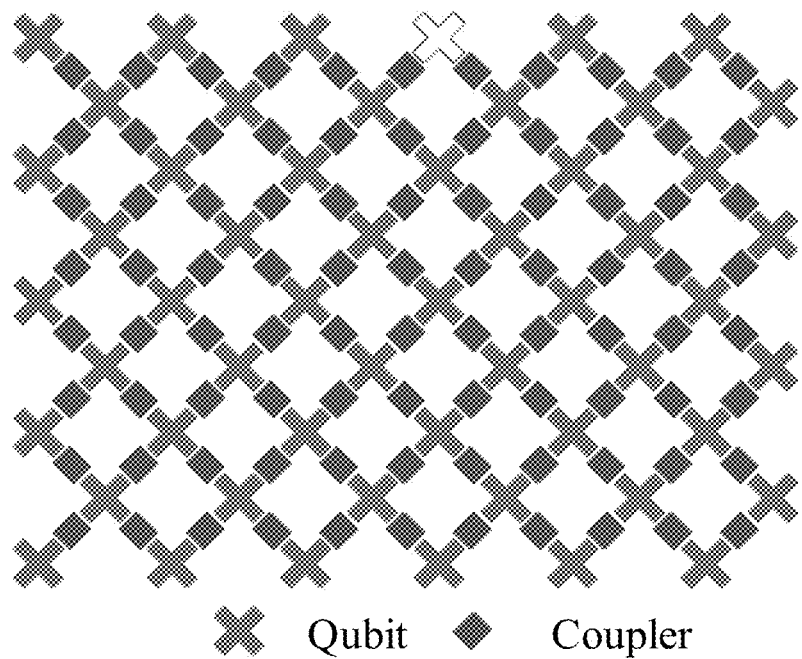
FIG. 2A is a schematic diagram of a qubit arrangement structure of a medium-scale quantum chip.
Figure 2B:
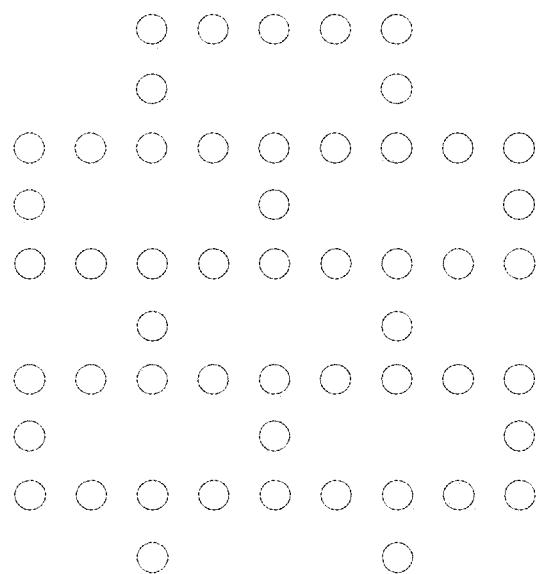
FIG. 2B is another schematic diagram of a qubit arrangement structure of a medium-scale quantum chip.

At present, the specific design, processing, measurement and control methods of medium-scale quantum chips are still in the stage of exploration and verification. FIG. 2A and FIG. 2B are schematic diagrams of a qubit arrangement structure of a medium-scale quantum chip. FIG. 2A is a schematic diagram of a qubit arrangement structure of a medium-scale quantum chip (referred to as Sycamore processor) provided by Google, and FIG. 2B is a schematic diagram of a qubit arrangement structure of a medium-scale quantum chip (referred to as Rochester processor) provided by IBM. The qubit arrangement structure provided by Google includes 53 qubits, and the coupling between the bits can be adjusted by adding an adjustable coupler between the qubits. The qubit arrangement structure provided by IBM also includes 53 qubits (represented by circles in the figure), but there is no coupler between the qubits, and the coupling between the bits can only be a fixed value.

Google's Sycamore processor (with a coupler between bits) adopts a rotary (or diagonal) surface code arrangement, and capacitive coupling is adopted between the filter and the reading cavity of the bit. As a result, the chip has a scattered arrangement, and takes up much space. Especially when there is no coupler between bits and the bit spacing is not large enough, such an arrangement and coupling method may no longer be applicable. IBM's Rochester processor (with no coupler between bits) adopts six rectangular blocks, the layout is scattered, and the bit connectivity is low, making it difficult to execute the algorithm. In addition, the Rochester processor adopts a planar structure, and the inevitable crossover also increase the instability and crosstalk of the system. Moreover, the different layouts of the two processors exhibit different chip performance, which indicates that different connectivity affects the performance benchmark of the chip and have different quantum volumes.

Based on the above two points, i.e., the current increasing demand for computing power and the wiring problem of existing medium-scale quantum chip designs, the embodiments of this application provide a quantum chip and a quantum computer. In the technical solutions of this application, the arrangement of qubits and related devices is optimized to achieve a larger number of bits and high accuracy at the same time, thereby increasing the computing power of the quantum chip. The technical solutions of this application are described below by using several embodiments.

Figure 3:
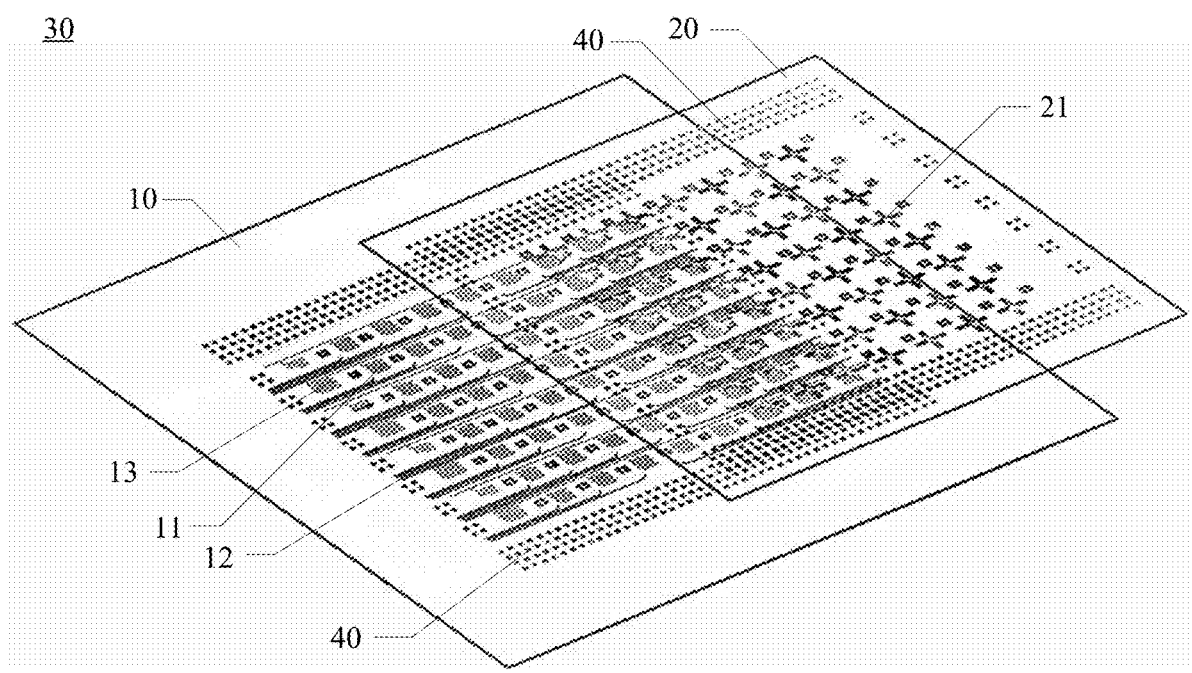
FIG. 3 is a schematic structural diagram of a quantum chip provided by an embodiment of this application.

FIG. 3 is a schematic structural diagram of a quantum chip 30 provided by an embodiment of this application. The quantum chip 30 includes a bottom sheet 10 and a top sheet 20.

In FIG. 3, the lower region a larger area is the bottom sheet 10, and the upper region is the top sheet 20. Optionally, the size of the top sheet 20 is smaller than the size of the bottom sheet 10. In FIG. 3, in order to show more details, the top sheet 20 is slightly raised and staggered from the bottom sheet 10.

A qubit array 21 is arranged on the top sheet 20. The qubit array 21 includes a plurality of qubits distributed in an array structure of M rows by N columns (represented by cross patterns in FIG. 3), that is, the array structure of the qubit array 21 adopts a row-column surface code structure, where M and N are both integers greater than 1.

Figure 4:
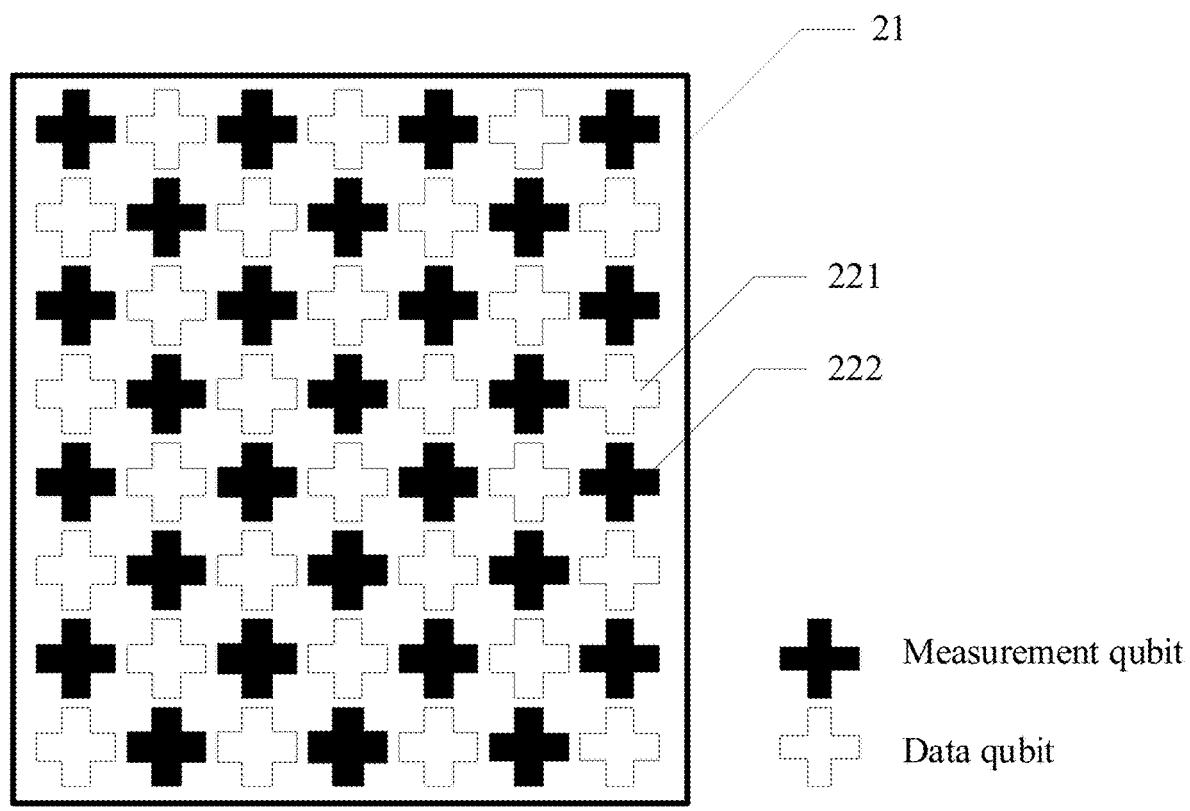
FIG. 4 is a schematic diagram of an array structure of a qubit array provided by an embodiment of this application.

FIG. 4 is a schematic diagram of an array structure of the qubit array 21. The arrangement of the qubits (represented by cross patterns in the figure) adopts the topology of a row-column surface code, which is arranged in M rows by N columns. Optionally, each of the M rows includes N qubits, and each of the N columns includes M qubits, that is, the number of qubits in the qubit array is M×N.

In addition, the qubits include data qubits 221 and measurement qubits 222. The data qubit 221 is configured to store data in quantum computing. The measurement qubit 222 is also called an auxiliary qubit, which is configured to stabilize and measure the quantum state of the data qubit 221. Optionally, as shown in FIG. 4, on each of the M rows, the data qubits 221 and the measurement qubits 222 are arranged alternately one by one; on each of the N columns, the data qubits 221 and the measurement qubits 222 are also arranged alternately one by one.

In various embodiments, a measurement qubit may be referred as an operational qubit, which in some implementations, is configured to facilitate the operation of a quantum chip, for example but not limited to, stabilizing a quantum state of a neighboring data qubit, and/or performing measurement of a neighboring data qubit.

According to the qubit arrangement of the surface code structure of M rows by N columns, each measurement qubit 222 at the boundary may be connected to three data qubits 221, and each measurement qubit 222 may be connected to three connected qubits 222. Each measurement qubit 222 may measure the quantum state of each data qubit 221 connected thereto once (except for the measurement qubits at the upper left and upper right corners, which can be connected to only two data qubits 221). Each data qubit 221 at the boundary may be connected to three measurement qubits 222 (except for the data qubits at the lower left and lower right corners, which can be connected to only two measurement qubits 222). According to an arrangement similar to that corresponding to the rotary surface code structure shown in FIG. 2A, the data (measurement) qubit at the boundary can be connected to only two measurement (data) qubits. Therefore, for the qubit arrangement method of the surface code structure of M rows by N columns, the number of redundant bits is increased, and more extra parity check operators are provided, so that more information about errors on the boundary can be obtained, allowing the chip to have a stronger error correction capability and analysis capability for boundary error distribution during decoding. In addition, at the same surface code scale, the area of the surface code structure of M rows by N columns is doubled, which makes it more convenient to prepare defects, and is large enough to provide space for defect entanglement and to implement basic quantum gates. Therefore, the surface code structure of M rows by N columns is more suitable for the design of quantum chips with a larger bit scale.

In addition, as shown in FIG. 3, a reading cavity 11 is provided on the bottom sheet 10. The reading cavity 11 is configured to acquire the status information of the qubit. In order to obtain the status information of a qubit, the qubit needs to be connected to some external measurement devices, and the measurement devices need to have characteristics such as accuracy, high efficiency and repeatability, bit coherence, non-destructiveness, and multiplexing at the same time. Generally, a resonant cavity is used as an intermediate medium to directly couple with the qubit, and the status information of the qubit is obtained by measuring the transmission characteristics of the resonant cavity. In this case, the resonant cavity is referred to as a reading cavity. In addition, the above-mentioned line connecting the reading cavity 11 and the external measurement device may be referred to as a reading line. The reading line may also be arranged on the bottom sheet 10 to transmit the status information of the qubit acquired by the reading cavity 11 to the external measurement device.

Optionally, as shown in FIG. 3, a bit control line 12 is further provided on the bottom sheet 10. The bit control line 12 is configured to transmit a bit control signal, and the bit control signal is used for controlling the qubit. The bit control line 12 may include a microwave control line and a direct current (DC) bias line. The microwave control line is also called an XY line, which is configured to transmit a microwave control signal, and the microwave control signal is used for driving the qubit to flip. The DC bias line is also called a Z line and is configured to transmit a DC bias signal, and the DC bias signal is used for adjusting a frequency of the qubit. In addition, the signal source of the above-mentioned bit control signal may be a signal generator, and an output end of the signal generator may be connected to the bit control line, so as to transmit the bit control signal generated by the signal generator to the bit control line. Then the bit control signal is transmitted to the qubit via the bit control line. In an example, the microwave control signal and the DC bias signal may share the same signal source, for example, share the same signal generator. In another example, the microwave control signal and the DC bias signal may be from different signal sources, for example, from different signal generators.

Optionally, as shown in FIG. 3, a filter 13 is further arranged on the bottom sheet 10, and the filter 13 is coupled to the reading cavity 11. In some implementations, the coupling between the filter 13 and the reading cavity 11 may include at least one of the following: coupling at capacitance level, coupling at induction level, and/or coupling at quantum level.

The filter 13 is configured to extend a coherence time of the qubit to reduce energy relaxation of the qubit toward an environment. As shown in FIG. 3, a filter 13 is coupled to the output end of the reading cavity 11, which can reduce the leakage at the bit frequency without affecting the bit reading.

The bottom sheet 10 and the top sheet 20 may be arranged in a laminated manner. For example, the top sheet 20 is located above the bottom sheet 10. The bottom sheet 10 and the top sheet 20 are electrically connected.

In an exemplary embodiment, a flip architecture is used to achieve electrical connection between the bottom sheet 10 and the top sheet 20, that is, a surface of the bottom sheet 10 on which circuits and components are arranged is opposite to a surface of the top sheet 20 on which the qubits are arranged. For example, the top sheet 20 is located above the bottom sheet 10, the reading cavity 11 is arranged on a surface of the bottom sheet 10 facing the top sheet 20, and the qubits are arranged on a surface of the top sheet 20 facing the bottom sheet 10.

In another exemplary embodiment, a non-flip architecture is used to achieve electrical connection between the bottom sheet 10 and the top sheet 20, that is, the surface of the bottom sheet 10 on which circuits and components and the surface of the top sheet 20 on which the qubits are arranged face toward the same direction. For example, the top sheet 20 is located above the bottom sheet 10, the reading cavity 11 is arranged on a surface of the bottom sheet 10 facing the top sheet 20 (that is, the reading cavity 11 is arranged on a surface of the bottom sheet 10 that faces upward), and the qubits are arranged on a surface of the top sheet 20 not facing the bottom sheet 10 (that is, the qubits are arranged on a surface of the top sheet 20 that faces upward).

Optionally, as shown in FIG. 3, the bottom sheet 10 and the top sheet 20 are electrically connected by metal solder joints 40. Optionally, the metal solder joints 40 may be indium pillar solder joints, or solder joints made of other conductive materials. Optionally, at least one first metal solder joint is formed on the bottom sheet 10, and at least one second metal solder joint is formed on the top sheet 20. The position of the at least one first metal solder joint is opposite to that of the at least one second metal solder joint. The bottom sheet 10 is electrically connected to the top sheet 20 by connecting the at least one first metal solder joint and the at least one second metal solder joint. If the flip architecture is used to achieve electrical connection between the bottom sheet 10 and the top sheet 20, at least one blind hole may be formed on a surface of the top sheet 20 facing the bottom sheet 10 (that is, the surface on which the qubits are arranged), a metal material is deposited in the blind hole to form the first metal solder joint, and then the first metal solder joint is electrically connected to the second metal solder joint on the bottom sheet 10. If a non-flip structure is used to achieve electrical connection between the bottom sheet 10 and the top sheet 20, at least one through hole may be formed on the top sheet 20, a metal material is deposited in the through hole to form the first metal solder joint, and then the first metal solder joint is electrically connected to the second metal solder joint on the bottom sheet 10. In addition, at least one blind hole is formed on the surface of the bottom sheet 10 facing the top sheet 20 (that is, the side where the components such as the reading cavity 11 are arranged), and a metal material is deposited in the blind hole to form the second metal solder joint.

In addition, a reading and control circuit of the quantum chip 30 is connected to pads (not shown) on the bottom sheet for realizing input and output of data and signals.

There are a plurality of devices on the quantum chip 30, such as the reading cavity, filter, bit control line, air bridge, qubit, indium pillar solder joint, etc. A complex processing technology is required, including aluminum (Al) plating, silicon dioxide ($SiO_2$) plating, adhesive dispensing and indium (In) plating, hydrofluoric acid (HF) introduction, formic acid introduction and many other steps. Each step has a certain impact on the junction resistance of the Josephson junction of the qubit. In the flip chip, the qubits are arranged on the top sheet 20 only, and necessary metal solder joints 40 (such as indium pillar solder joints) for electrical connection to the bottom sheet are kept on the top sheet 20. All other devices are arranged on the bottom sheet 10, so that related processes (such as $SiO_2$ plating, HF introduction, formic acid introduction, etc.) are moved out of the bit sample layer (which is a sample layer where the qubits are processed, that is, the top sheet 20), so as not to affect the bit performance. Therefore, in this way, some destructive devices or processing techniques can be moved out of the bit sample layer, thereby increasing the chip wiring space and the coherence of the qubits under complex processes.

Optionally, a region of the bottom sheet 10 corresponding to the top sheet 20 adopts a fully-enclosed air bridge to increase isolation between bit control signals. Compared with a traditional split-type superconducting vacuum bridge (where the bridge approach is usually an inclined plane, and the angle depends on the height and span of the bridge) often used in the planar chip structure, the embodiments of this application adopt a fully-enclosed air bridge in the region of the bottom sheet 10 corresponding to the top sheet 20 in the flip quantum chip to increase the isolation between bit control signals, and the remaining part adopts a split-type air bridge or a fully-enclosed air bridge. The height of the air bridge of the superconducting vacuum bridge used in the embodiments of this application is controllable, the bridge approach part is a gentle arc, and the entire air bridge is arched, which has better stability while ensuring isolation.

In addition, the quantum chip provided by the embodiments of this application may be a medium-scale quantum chip, which, for example, includes 50-100 qubits. In an example, the qubit array 21 on the top sheet 20 has a structure of 8 rows by 7 columns as shown in FIG. 4 and includes 56 qubits in total.

The present disclosure also describes a method for manufacturing a quantum chip. The method includes: constructing a bottom sheet and a top sheet; disposing a qubit array on the top sheet, the qubit array comprising a plurality of qubits distributed in an array structure of M rows by N columns, and M and N being both integers greater than 1; disposing a reading cavity on the bottom sheet, and the reading cavity being configured to acquire status information of a qubit in the qubit array; and electrically connecting the bottom sheet and the top sheet.

Based on the above, according to the technical solutions provided by the embodiments of this application, on the one hand, in terms of the arrangement of qubits, a surface code structure arranged in M rows by N columns is adopted to provide better connectivity between qubits, which is beneficial to increasing the quantum volume and reducing the difficulty of algorithm execution, and provides a stronger error correction capability and analysis capability for boundary error distribution during decoding, as well as more flexible scalability and adaptability to larger-scale quantum chips. On the other hand, in terms of chip architecture, qubits are laid out on the top sheet, and other devices such as the reading cavity, filters, bit control lines, reading lines, and air bridges are arranged on the bottom sheet, which realizes the separate layout of qubits and other devices to move some lossy devices or processing techniques out of the bit sample layer, thereby increasing the chip wiring space and the coherence of the qubits under complex processes. Based on the above two points, the arrangement of qubits and related devices is optimized to achieve a larger number of bits and high accuracy at the same time, thereby increasing the computing power of the quantum chip.

A process of reading the qubit is described below. In an exemplary embodiment, the filter is inductively coupled to the reading cavity, and the filter acquires the status information of the qubit by reflective reading. The reading method of the filter usually includes a transmissive reading method and a reflective reading method. The transmissive reading method means that the signal input end and the signal output end do not share the same port, and the reflective reading method refers to that the signal input end and the signal output end share the same port.

Figure 5:
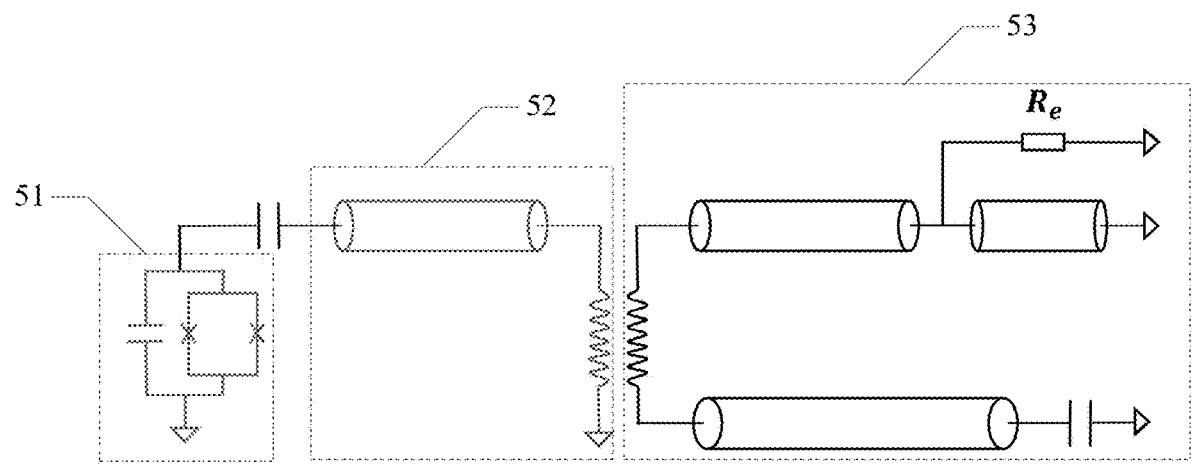
FIG. 5 is a schematic diagram of a reading circuit of a qubit provided by an embodiment of this application.

FIG. 5 is a schematic diagram of a reading circuit of a qubit. In this schematic diagram, a transmission line model is used for illustration. A dashed box 51 represents an equivalent circuit diagram of the qubit, including a coupling capacitance (in the dashed box 51) of the qubit and a superconducting quantum interference device (SQUID) composed of two Josephson junctions. A dashed box 52 represents an equivalent circuit diagram of the reading cavity. A dashed box 53 represents an equivalent circuit diagram of the filter. It can be seen from the figure that inductive coupling is adopted between the reading cavity and the filter.

As can be learned from definitions, a quality factor $Q_r$ of the reading cavity may be expressed as:

$$Q_r = \frac{\text{energy lost in reading cavity}}{\text{energy lost each time the reading cavity oscillates one radian}} = \frac{E_r \omega_r}{P_{loss}}$$

where $P_{loss}$ represents energy lost in the reading cavity, $E_r$ represents energy stored in the reading cavity, and $\omega_r$ represents a frequency of the reading cavity.

Generally, the internal loss of the reading cavity is very small, so it may be assumed that the only dissipative channel in the entire circuit is the coupling between the filter and the external measurement circuit. This process may be described using a quality factor $Q_f$ of the filter:

$$Q_f = \frac{\text{energy lost in filter}}{\text{energy lost each time the filter oscillates one radian}} = \frac{E_f \omega_f}{P_{loss}}$$

where $P_{loss}$ represents energy lost in the filter, $E_f$ represents energy stored in the filter, and $\omega_f$ represents a frequency of the filter.

Based on the assumption, energy dissipated per unit time after the entire circuit is the same, and then:

$$\frac{Q_r}{Q_f} = \frac{E_r \omega_r}{E_f \omega_f} = \left|\frac{I_r}{I_f}\right|^2$$

where $\omega_i$ and $I_i$ (i=r,f) respectively represent the frequency and current of the reading cavity and the filter in an equivalent lumped model Similar to $Q_r$ and $Q_f$, a quality factor $Q_q$ of the qubit may be expressed as:

$$Q_q = \frac{\text{energy lost in bit}}{\text{energy lost each time the bit oscillates one radian}} = \frac{E_q \omega_q}{P_{loss}} = \omega_q T_1$$

where $P_{loss}$ represents energy lost in the qubit, $E_q$ represents energy stored in the qubit, and $\omega_q$ represents a frequency of the qubit, and $T_1$ represents a coherence time of the qubit.

$$\kappa_r T_1 = \left(\frac{\Delta}{g_{res-q}}\right)^2 \frac{\omega_r}{\omega_q} \left|\frac{z_{ext}^q}{z_{ext}^r}\right|^2$$

may be obtained from $Q_f$ and $Q_q$, where $z_{ext}^q$ and $z_{ext}^r$ respectively represent equivalent impedances of the filter at different frequencies $\omega_q$ and $\omega_r$, $\kappa_r$ represents a ratio of photon attenuation in the reading cavity, and $\Delta$ represents a frequency difference between the reading cavity and the bit, that is, $\Delta = \omega_q - \omega_r$, where $g_{res-q}$ represents a coupling strength between the reading cavity and the bit. If $Q_f$=30, $\omega_r/2\pi$=6.4625 GHz, $\omega_f/2\pi$=6.5 GHz, and $\omega_q/2\pi$=5.5 GHz, then $$\frac{\omega_r}{\omega_q}\left|\frac{z_{ext}^q}{z_{ext}^r}\right|^2 \approx 103.$$

Obviously, compared with the case without the filter, $\kappa_r T_1$ can be amplified by two orders of magnitude. $\kappa_r T_1$ reflects the coherence time of the qubit. $\kappa_r T_1$ being amplified by two orders of magnitude means that while ensuring the speed of reading the qubit by the circuit, the coherence time of the qubit can be extended by about 100 times, allowing more gate operations, and laying a foundation for the improvement of the gate fidelity and the practical application of quantum computing.

It can be seen that on the one hand, the inductive coupling between the filter and the reading cavity can make the layout compact; on the other hand, because the filter adopts the reflective reading method in which the signal input and output ends share the same port, the number of reading lines can be reduced by half; and based on the two points, the circuit arrangement of the quantum chip can be optimized, and the reading efficiency and coherence time of the bit can also be ensured.

Figure 6:
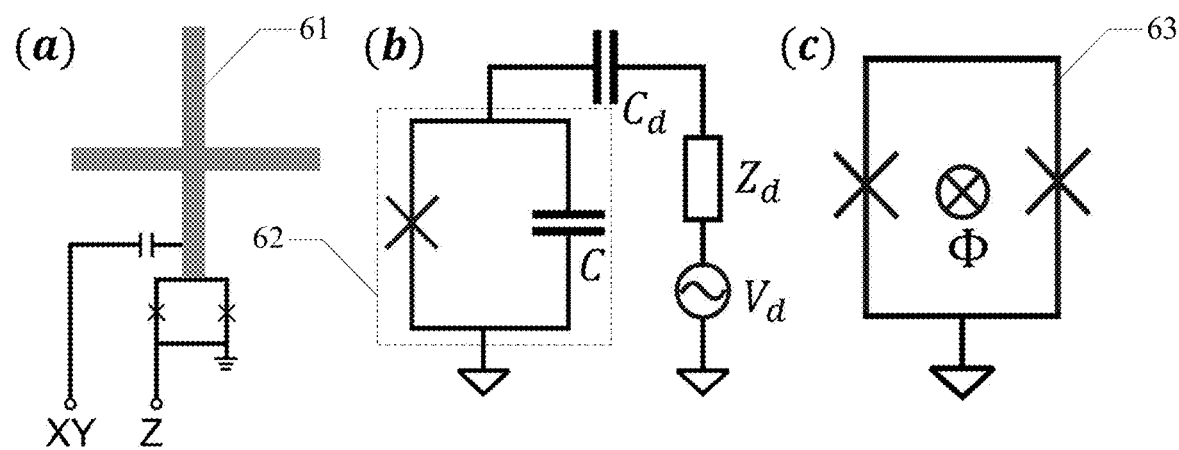
FIG. 6 is a schematic diagram of a drive circuit of a single qubit provided by an embodiment of this application.

A process of controlling the qubit is described below. FIG. 6 is a schematic diagram of a drive circuit of a single qubit.

As shown in part (a) of FIG. 6, control of a qubit 61 is usually implemented by bit control lines (including XY lines and Z lines). A microwave control line (also called an XY line) is configured to transmit a microwave control signal, and the microwave control signal is used for driving the qubit to flip. The DC bias line (called a Z line) is configured to transmit a DC bias signal, and the DC bias signal is used for adjusting a frequency of the qubit. Usually the XY line couples a voltage source $V_d$ having an input impedance of $Z_d$ to the qubit through a coupling capacitance $C_d$ (as shown in part (b) in FIG. 6, a dashed box 62 represents an equivalent circuit diagram of the qubit 61). To simplify the computing, an LC oscillator circuit is used to replace the bit, where L and C represent the inductance and capacitance of the circuit, respectively. In this case, an Hamiltonian of the system is described as $$H = -\frac{\hbar}{2}\omega_q \sigma_z + \frac{C_d V_d}{C_\Sigma}\sqrt{\frac{\hbar}{2Z_r}}\sigma_y,$$

where $\omega_q$ is the frequency of the qubit, $Z_r = \sqrt{L/C}$ is the characteristic impedance in the LC oscillator circuit, $C_\Sigma$ is the total capacitance of the qubit to ground in this case, and $\sigma_z$ and $\sigma_y$ are respectively Pauli z and Pauli y operators, which describe projection components of spin $\sigma$ on the z-axis and y-axis of a three-dimensional Euclidean space. $\hbar = 1.055 \times 10^{-34}$ J•s is the reduced Planck constant. It can be seen from the Hamiltonian that the qubit can be excited by applying a driving voltage signal in the circuit. As shown in part (c) of FIG. 6, when the qubit has two junctions (where each x in the figure represents one junction), the formed SQUID can be equivalently regarded as a Josephson junction 63 whose critical current changes with the external magnetic field. The change of energy $E_J$ of the Josephson junction with the external magnetic field may be expressed as $$E_J = E_{J\Sigma}\cos\left(\frac{\pi\Phi}{\Phi_0}\right),$$

where $\Phi$ is the magnetic flux passing through the SQUID, $E_{J\Sigma}$ is the energy of the Josephson junction 63 when $\Phi$ is equal to 0, $\Phi_0 = h/2e$ is a magnetic flux quantum, h is the Planck constant, $h = 2\pi\hbar = 6.626 \times 10^{-34}$ J•s, e is the charge constant, and $e = 1.602 \times 10^{-19}$ C. Correspondingly, the change of $\omega_q$ with the external magnetic field is expressed as:

$$\hbar\omega_q = \sqrt{8E_C E_{J\Sigma}\left|\cos\left(\frac{\pi\Phi}{\Phi_0}\right)\right|} - E_C,$$

where $E_C$ is the electrostatic energy of the capacitance, and it is assumed that the asymmetry of the junction in the bit is small.

In the embodiments of this application, the microwave control line (XY line) and the DC bias line (Z line) share (or use) the same control line, that is, the microwave control signal and the DC bias signal share the same bit control line, and the microwave control signal and the DC bias signal may be transmitted at different time points, so that the two signals can be transmitted using the same control line while ensuring the accuracy and reliability of the signals. Optionally, the bit control line is configured to drive the qubit to transition between different energy levels by mutual induction with the qubit. By using the same line as the XY line and the Z line, a current is used to drive the quantum bit to transition. Similarly, a Lagrangian quantity of the system may be expressed as $$L = \frac{1}{2}C\dot{\Phi}^2 - \frac{(\Phi - MI)^2}{2L} - \frac{MI^2}{2},$$

and then the Hamiltonian of the system is $$H = \frac{q^2}{2C} + \frac{\Phi^2}{2L} - \frac{MI\Phi}{L} + \frac{M^2I^2}{2L} + \frac{MI^2}{2},$$

where C is the capacitance, L is the inductance, $\dot{\Phi}$ is the derivative of $\Phi$, I is the current, and $\Phi$ and q respectively represent the magnetic flux on the inductance L and the charge on the capacitor C in the LC oscillator circuit, and are both conjugate variables; and M is mutual inductance between the bit control line and the qubit. Based on $$\Phi = \sqrt{\frac{\hbar Z_r}{2}}(a + a^\dagger) \text{ and } q = -i\sqrt{\frac{\hbar}{2Z_r}}(a + a^\dagger),$$

where $a$ and $a^\dagger$ are boson raising and lowering operators corresponding to the microwave photon in the LC oscillator circuit, the Hamiltonian is rewritten with the raising and lowering operators, and the system is truncated to two energy levels, to obtain:

$$H = -\frac{\hbar\omega_q}{2}\sigma_z - \frac{MI}{L}\sqrt{\frac{\hbar Z_r}{2}}\sigma_x$$

where $\sigma_x$ is the Pauli x operator, which describes the projection component of the spin $\sigma$ on the x axis of the three-dimensional Euclidean space. It can be seen from the second term in the above formula that applying a driving current to the circuit can cause the qubit to transition.

In the embodiments of this application, by using the same line as the XY control line and the Z control line of the qubit, the number of control lines can be reduced by half, thereby saving the chip wiring space.

Various embodiments in the present disclosure may adopt a surface code structure of M rows by N columns to provide better connectivity between qubits, which is beneficial to increasing the quantum volume and reducing the difficulty of algorithm execution; and on the other hand, realizes the separate layout of qubits and other components to move some destructive devices or processing techniques out of the bit sample layer, thereby increasing the chip wiring space and the coherence of the qubits under complex processes. Based on the above two points, a larger number of bits and high accuracy are achieved at the same time, thereby increasing the computing power of the quantum chip.

An exemplary embodiment of this application further provides a quantum processor, which includes the quantum chip described in the above embodiment.

An exemplary embodiment of this application further provides a quantum computer, which includes the quantum chip described in the above embodiment.

It is to be understood that the term "a/the plurality of" mentioned in this specification means two or more. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A quantum chip, comprising:
   a bottom sheet and a top sheet;
   a qubit array disposed on the top sheet, the qubit array comprising a plurality of qubits distributed in an array structure of M rows by N columns, and M and N being both integers greater than 1;
   a reading cavity disposed on the bottom sheet, and the reading cavity being configured to acquire status information of a qubit in the qubit array;
   a filter disposed on the bottom sheet to acquire the status information of the qubit by reflective reading, wherein:
      the filter is configured to extend a coherence time of the qubit in the qubit array to reduce energy relaxation of the qubit toward an environment surrounding the qubit, and
      in the reflective reading, signal input and output ends share a same port; and
   the bottom sheet and the top sheet being electrically connected.

2. The quantum chip according to claim 1, wherein:
   the plurality of qubits comprise a plurality of data qubits and a plurality of measurement qubits;
   for each of the M rows, the data qubits and the measurement qubits are arranged alternately one by one; and
   for each of the N columns, the data qubits and the measurement qubits are arranged alternately one by one.

3. The quantum chip according to claim 1, wherein:
   each of the M rows comprises N qubits, and
   each of the N columns comprises M qubits.

4. The quantum chip according to claim 1, wherein:
   the top sheet is located above the bottom sheet,
   the reading cavity is disposed on a surface of the bottom sheet facing the top sheet, and
   the qubit array is disposed on a surface of the top sheet facing the bottom sheet.

5. The quantum chip according to claim 1, wherein the bottom sheet and the top sheet are electrically connected by metal solder joints.

6. The quantum chip according to claim 1, wherein:
   the filter is coupled to the reading cavity.

7. The quantum chip according to claim 6, wherein the filter and the reading cavity are inductively coupled.

8. The quantum chip according to claim 1, further comprising:
   a bit control line disposed on the bottom sheet, the bit control line being configured to transmit a microwave control signal and a direct current (DC) bias signal, wherein:
      the microwave control signal is used for driving a qubit in the qubit array to transition between different energy levels;
      the DC bias signal is used for adjusting a frequency of the qubit; and
      the microwave control signal and the DC bias signal share the bit control line.

9. The quantum chip according to claim 8, wherein the bit control line is configured to drive the qubit to transition between different energy levels by mutual induction with the qubit.

10. The quantum chip according to claim 1, wherein a region of the bottom sheet corresponding to the top sheet adopts a fully-enclosed air bridge to increase isolation between bit control signals.

11. The quantum chip according to claim 1, wherein the quantum chip is a medium-scale quantum chip.

12. A quantum computer, comprising:
    a quantum chip, wherein the quantum chip comprises:
       a bottom sheet and a top sheet;
       a qubit array disposed on the top sheet, the qubit array comprising a plurality of qubits distributed in an array structure of M rows by N columns, and M and N being both integers greater than 1;
       a reading cavity disposed on the bottom sheet, and the reading cavity being configured to acquire status information of a qubit in the qubit array;
       a filter disposed on the bottom sheet to acquire the status information of the qubit by reflective reading, wherein:
          the filter is configured to extend a coherence time of the qubit in the qubit array to reduce energy relaxation of the qubit toward an environment surrounding the qubit, and
          in the reflective reading, signal input and output ends share a same port; and
       the bottom sheet and the top sheet being electrically connected.

13. The quantum computer according to claim 12, wherein:
    the plurality of qubits comprise a plurality of data qubits and a plurality of measurement qubits;
    for each of the M rows, the data qubits and the measurement qubits are arranged alternately one by one; and
    for each of the N columns, the data qubits and the measurement qubits are arranged alternately one by one.

14. The quantum computer according to claim 12, wherein:
    each of the M rows comprises N qubits, and
    each of the N columns comprises M qubits.

15. The quantum computer according to claim 12, wherein:
    the top sheet is located above the bottom sheet,
    the reading cavity is disposed on a surface of the bottom sheet facing the top sheet, and
    the qubit array is disposed on a surface of the top sheet facing the bottom sheet.

16. A method for manufacturing a quantum chip, the method comprising:
    constructing a bottom sheet and a top sheet;
    disposing a qubit array on the top sheet, the qubit array comprising a plurality of qubits distributed in an array structure of M rows by N columns, and M and N being both integers greater than 1;
    disposing a reading cavity on the bottom sheet, and the reading cavity being configured to acquire status information of a qubit in the qubit array;
    disposing a filter on the bottom sheet to acquire the status information of the qubit by reflective reading, wherein:

the filter is configured to extend a coherence time of the qubit in the qubit array to reduce energy relaxation of the qubit toward an environment surrounding the qubit, and in the reflective reading, signal input and output ends share a same port; and electrically connecting the bottom sheet and the top sheet.

17. The method according to claim 16, wherein:

the plurality of qubits comprise a plurality of data qubits and a plurality of measurement qubits;

for each of the M rows, the data qubits and the measurement qubits are arranged alternately one by one; and for each of the N columns, the data qubits and the measurement qubits are arranged alternately one by one.

18. The method according to claim 16, wherein:

each of the M rows comprises N qubits, and each of the N columns comprises M qubits.

19. The method according to claim 16, wherein:

the top sheet is located above the bottom sheet, the reading cavity is disposed on a surface of the bottom sheet facing the top sheet, and the qubit array is disposed on a surface of the top sheet facing the bottom sheet.

* * * * *